United States Patent [19]

Miyao

[11] Patent Number: 6,141,318
[45] Date of Patent: Oct. 31, 2000

[54] NETWORK DESIGN METHOD

[75] Inventor: Yasuhiro Miyao, Tokyo, Japan

[73] Assignee: NEC Corporation, Tokyo, Japan

[21] Appl. No.: 09/007,078

[22] Filed: Jan. 14, 1998

[30] Foreign Application Priority Data

Jan. 17, 1997 [JP] Japan ..................... 9-019881

[51] Int. Cl.$^7$ ............................. G01R 31/08
[52] U.S. Cl. .............. 370/217; 370/255; 370/23 B; 709/239
[58] Field of Search ................... 370/217, 252, 370/255, 238; 709/239, 241; 705/8

[56] References Cited

U.S. PATENT DOCUMENTS

| | | | |
|---|---|---|---|
| 4,744,028 | 5/1988 | Karmarkar | 705/8 |
| 5,546,542 | 8/1996 | Cosares et al. | 709/241 |

FOREIGN PATENT DOCUMENTS

| | | |
|---|---|---|
| 1-190047 | 7/1989 | Japan . |
| 3-188724 | 8/1991 | Japan . |
| 5-91103 | 4/1993 | Japan . |
| 6-315023 | 11/1994 | Japan . |

OTHER PUBLICATIONS

Gersht et al., "Real–Time bandwidth Allocation and Path Restorations in Sonet–Based Self–Healing Mesh Networks", IEEE, pp. 250–255, Feb. 1993.

G. R. Ash et al, "Robust Traffic Design for Dynamic Routing Networks", IEEE Proceedings of INFOCOM '91, pp. 0508–0514.

R. R. Iraschko et al, Optical Capacity Placement for Path Restoration in Mesh Survivable Networks, 0–7803–3205–4, 1996 IEEE, pp. 1568–1574.

Yijun Xiong et al, Restoration Strategies and Spare Capacity Requirements in Self–Healing ATM Networks, 0–8186–7780–5/97 IEEE.

Katzutaka Murakami et al, "Comparative Study on Restoration Schemes of Survivable ATM Networks", 0–8186–7780–5/97 IEEE.

*Primary Examiner*—Hassan Kizou
*Assistant Examiner*—John Pezzlo
*Attorney, Agent, or Firm*—Sughrue, Mion, Zinn, Macpeak & Seas, PLLC

[57] ABSTRACT

A network design method allowing to build, at a low cost, a network which operates properly even upon failure occurs or load variation, satisfying a capacity required by a demand pair. The method solves an integer programming problem containing an objective function that minimizes the cost of link capacity. The problem receives information on a network topology, failure patterns indicating where a failure occurred, a demand capacity of a current path of a demand pair in each time zone and direction, a demand capacity of a standby path to be used when a failure occurs on the current path, and combination candidates of the current path and the standby path. The problem contains indicator variables indicating whether to use a combination of a current path and a standby path connecting the ends of each demand pair in each time zone and variables indicating the capacity to be assigned to each link. The method solves the problem under a constraint that the total of the indicator values for the request pair must be 1 and under a constraint that either the current path or the standby path is used for each time zone, each state, and each request pair and that the total of the demand capacities of all the paths going through a link ought not to exceed the capacity of the link.

7 Claims, 3 Drawing Sheets

NETWORK DESIGN METHOD

FIELD OF THE INVENTION

The present invention relates to a network design method, and more particularly to a network design method which allows a network to work properly even when a failure occurs or a demand capacity varies with time.

BACKGROUND OF THE INVENTION

An example of a conventional network configuration is shown in FIG. 5. As shown in FIG. 5, the network is composed of nodes (11, 12, ..., 15 in the figure) and links (21, 22, ..., 26 in the figure). A communication route which passes through a plurality of nodes and links and which is terminated by a pair of nodes is called a "path". Each node is a junction on a path or terminates a path, and each link accommodates one or more paths (i.e., a link is a part through which a path passes).

In FIG. 5, path 33 is terminated by nodes 11 and 13 and junctioned by node 12. At the same time, path 33 is accommodated by links 21 and 22. A pair of nodes terminating a path is called a "demand pair."

In a normal state in which no failure is found in all the nodes and links of a network, a path used by a demand pair is called a "current path." For example, in FIG. 5, path 31 is the current path of the demand pair composed of nodes 11 and 13.

When a failure occurs in a node or a link, the demand pair whose current path is affected by the failure switches the current path to a path called a "standby path (or spare path)." For example, in FIG. 5, the demand pair composed of nodes 11 and 13 has two standby paths: path 32 and path 33. When the current path 31 is affected by a failure, path 32 or path 33 is used as a standby path.

It should be noted that each path is associated with two factors: one is the route to be defined by the sequence of nodes and links between the two nodes of a demand pair, and another is the "capacity." And, if a link can accommodate a path with a capacity c, it implies that the link has a vacant capacity of c.

For a demand pair affected by a network failure to have a standby path, the capacity required for the current path and the capacity required for the standby path must be allocated to the link.

A conventional network design method aims at determining the topology of a network composed of nodes and links, the demand capacity of a demand pair, the capacity to be allocated to each link and the path route of each demand pair when a failure pattern is given.

For example, "Robust Traffic Design for Dynamic Routing Networks" (IEEE proceedings of INFOCOM'91, 1991, pp. 508–514) describes a method which determines a path ensuring a minimized cost of link capacity, when a network failure occurs under the condition that each link can accommodate a path which will be used by each demand pair.

The following symbols are used to formulate this problem.

First, numbers are assigned as follows:
l=1, ..., L: Number assigned to a link
m=1, ..., M: Number assigned to a demand pair
$i_m$=1, ..., $I_m$: Number assigned to a path candidate that will be used by demand pair m
s=0: Number assigned to a normal state of a network
s=1, ..., S: Number assigned to each failure state of a network.

Constants are defined as follows:
$\omega$: Link capacity augmentation unit (for example, a transmission capacity per fiber optic cable)
$a_1$: Cost of capacity augmentation unit $\omega$ for link 1
$g_{im}^1$: Indicator assuming "1" when path $i_m$ is accommodated by link 1; "0" when path $i_m$ is not accommodated by link 1.
$v_m^s$: Capacity requested by demand pair m in a network state s
$i_m^0$: Current path used by demand pair m
$d_1^0$: Number of capacity augmentation units required for link 1 to accommodate the current path of each demand pair. In this case, the total capacity of link 1 is given as $\omega\, d_1^0$.

Variables are defined as follows:
$c_{im}^s$: Capacity allocated to path im in the state s.
$d_1$: Number of capacity augmentation units for link 1. The total capacity of a link is given as $\omega\, d_1$. The cost of link 1 is given as $a_1 d_1$.

Using the above symbols, the conventional network design method has solved the following linear programming problem to determine a path and its capacity to be used by each demand pair in each state:

A problem by which the values of variables for optimizing (minimizing or maximizing) an objective function, as well as the value generated by the objective function using those values, are obtained is called a "mathematical programming problem." The values of variables used in this problem are within a specific range of values satisfying a specific constraint. In particular, a mathematical programming problem in which an objective function and the constraint are expressed by variables in linear format is called a "linear programming problem."

To solve the following problem, it is necessary to give possible path candidates to each demand pair. This generates an indicator $g_{im}^1$.

$$\text{minimize} \sum_{l=1}^{L} a_l d_l \tag{1}$$

subject to $$\sum_{m=1}^{M} \sum_{i_m=1}^{I_m} g_{i_m}^l c_{i_m}^s \leq f_l^s \omega d_l \quad (s=1,\ldots,S,\ \ l=1,\ldots,L) \tag{2}$$

$$\sum_{i_m=1}^{I_m} c_{i_m}^s \geq v_m^s (s=1,\ldots,S,\ \ m=1,\ldots,M) \tag{3}$$

$$d_l \geq d_l^0 (l=1,\ldots,L) \tag{4}$$

$$c_{im}^s \geq 0 (s=1,\ldots,S,\ m=1,\ldots,M,\ i_m=1,\ldots,I_m) \tag{5}$$

The above formula (1) shows that the total of the costs accompanying each link capacity is the objective function which is to be minimized.

The above formula (2) is a constraint representing that the total of the capacities of paths accommodated by each link does not exceed the total capacity of the link.

The above formula (3) is a constraint representing that the total of the capacities assigned to the paths to be used by each demand pair when a failure occurs is equal to or greater than the capacity requested by each demand pair in a network state s.

SUMMARY OF THE DISCLOSURE

However, according to the investigation toward the present invention it has turned out that the conventional network design method described above has the following problems:

(1) It is a first problem that, when the current path is affected by any failure, control of switching to a standby path is complicated.

This is because the above-described method determines a path to be used in each failure state by solving the problem containing variables, to which the capacity to be assigned to each path for each network failure state is assigned. This means that a standby path to be used by each demand pair varies according to the type or state of the network failure and, in some cases, more than one standby path are used for a network failure.

(2) It is a second problem that the cost is higher than that of a method in which current paths and standby paths are designed at the same time or in which paths are designed by taking into consideration the demand capacity for each time zone and for each direction.

This is because a predetermined current path and the capacity of a link accompanying the current path are first given, and then a link is selected to accommodate a path that satisfies the demand capacity required for a demand pair when a network failure occurs.

In addition, in case where the demand capacity varies according to the time zone or the direction, the demand capacity must be the maximum for each time zone or each direction capacity.

Generally, the present invention seeks to solve the problems associated with the prior art described above.

Accordingly, it is an object of the present invention to provide a novel network design method satisfying the demand capacity of each demand pair while considering failure and/or load variation particularly, based on the distributed control on each demand pair in the network.

According to a first aspect of the present invention, there is provided a network design method for use in a network having a plurality of nodes each terminating a path or each being a junction on the path and having a plurality of links each accommodating said path. The method comprises the following steps providing a plurality of combination candidates of a first to an N-th path for a demand pair composed of a pair of the nodes, N being an integer of at least 2 and said demand pair having a demand capacity;

solving a mathematical programming problem. The mathematical programming problem comprises objective functions which comprises:

indicators as variables each indicating whether or not each of the demand pairs uses each of the combination candidates as a combination of a current path and any one of first to (N-l)th standby paths in one or more time zones and in each direction, and a first constraint under which a total of said indicators for each of the combination candidates is 1 in the demand pair, in the one or more time zones, and in each of the directions.

The objective function further comprises:

a capacity to be assigned to the current path accommodated by each of the links, when said current path is not affected by a failure on the network in the one or more time zones, in each of the directions, and in a normal state and each failure state of the network, a capacity to be assigned to the first standby path accommodated by said link, when the current path corresponding to the first standby path is affected by a failure on said network, a capacity to be assigned to said n-th (n=2, . . . , N−1) standby path accommodated by said link when the current path corresponding to the nth standby path and the first to (n−1)th standby paths are affected by a failure on the network, where N is an integer of at least 3, and a second constraint under which a total of the capacity of the current path accommodated by the link and capacities of the first standby path to (N−1)th standby path for the demand pair does not exceed a capacity assigned to the link.

Based on a solution of the mathematical programming problem determination is performed of a combination of the current path, any one of the first standby path to the (N−1)th standby path, and a capacity to be assigned to each of the links, for use by each of the demand pairs, in the one or more time zones and in each of the directions.

According to a second aspect of the present invention there is provided a network design method as captioned at the first to third paragraphs of the first aspect. The method comprises the steps of:

The mathematical programming problem comprises objective functions which comprise:

capacities to be assigned to each of the combination candidates for each of the demand pairs in one or more time zones and in each direction, each of the combination candidates being composed of a current path which is any one of a first to an N-th path and any one or more of first to (N−1)th standby paths corresponding to the current path, and a first constraint under which a total of capacities to be assigned to the current path satisfies the demand capacity of the demand pair in the one or more time zones and in each of the directions.

The objective functions further comprise:

capacities each to be assigned to the current path accommodated by the link when said current path is not affected by a failure on said network in the one or more time zones, in each of the directions, and in a normal state and a failure state of the network, a capacity to be assigned to the first standby path when the current path corresponding to the first standby path is affected by a failure on the network, a capacity to be assigned to the n-th (n=2, . . . , N−1) standby path accommodated by the link when the current path and the first to (n−1)th standby paths are affected by a failure on the network, where N is an integer of at least 3, and a second constraint under which a total of the capacities of the current path and any one of the first standby path to (N−1)th standby path for the demand pair does not exceed a capacity assigned to the link.

Based on a solution the mathematical programming problem, determination is performed of a capacity to be assigned to the demand pairs and to each of the first standby path to the (N−1)th standby path, and a capacity to be assigned to each of the links, in one or more time zones and in each of the directions.

According to a third aspect, there is provided a computer-readable medium having stored therein a network design program adapted for execution by a data processing system in connection with the network. The computer program comprises the steps mentioned in the first aspect. The medium may be static or dynamic (or active) one.

According to a fourth aspect, there is provided a computer-readable medium having stored therein a network design program as mentioned by the second aspect.

In a fifth aspect, there is provided a network design method as captioned in the first paragraph of the first aspect.

The method comprises the following steps:

(a) providing a network topology, a failure pattern specifying a location at which a failure occurs on the network, a demand capacity for a current path of a demand pair which is a pair of nodes, each terminating the path, in each time zone and in each direction and a demand pair for a standby path to be used when the current path is affected by the network failure, and combination candidates of a current path and a standby path in the each demand pair;

(b) solving an integer programming problem having an objective function which minimizes a cost caused by the link capacity based on information given by the preceding steps, the objective function having:

as variables indicators each indicating whether to use a combination of a current path and a standby path of each demand pair in each time zone and capacities to be assigned to each link, and a first constraint under which a total of values of said indicators of each demand pair is 1; and having a second constraint under which, in each time zone, in each network state, and in each demand pair, the current path is accommodated by a link if the current path passing through the each link is not affected by a failure, and a standby path is accommodated if the current path is affected by the failure provided that a standby path corresponding to this current path passes through the link and, as a result, a total of capacities of all paths accommodated by a link does not exceed the capacity of the link; and (c) determining, from a result of solution of the integer programming problem, link capacities as well as a current path and a standby path to be used by each demand pair in each time zone.

In a sixth aspect based on the fifth aspect, combination candidates of a current path, a standby path, and a second standby path which is used when said current path and the standby path are affected by the network failure at the same time are provided. Based on the candidates, the integer programming problem is solved by introducing integer variables that assume a value "1" when demand pair m uses a path im as the current path, a path jm as the standby path, and a path km as the second standby path in a time zone.

In the seventh aspect based on the fifth or sixth aspect, the integer programming problem is a mixed integer programming problem which comprises a variable representing the capacity to be assigned to the current path when, in a particular time zone, the demand pair m uses the path im as the current path, uses the path jm as the standby path, and/or uses the path km as the second standby path, the mixed integer programming problem further comprising a condition that the capacity to be assigned to the standby path is not less than the capacity value assigned to the current path multiplied by a request recovery ratio. By solving the mixed integer programming problem the capacity is assigned to the current path and the standby path in each time zone and for each demand pair.

The network design method allows a user to build, at a low cost, a network which operates properly even when a failure occurs or a load varies and which satisfies a capacity required by a demand pair. The method solves an integer programming problem containing an objective function that minimizes the cost of link capacity. That is, the problem receives information on a network topology, a failure pattern (s) indicating where a failure occurred, a demand capacity of a current path of a demand pair in each time zone and direction, a demand capacity of a standby path to be used when a failure occurs on the current path, and combination candidates of the current path and the standby path. The problem (objective function(s)) contains indicator variables indicating whether to use a combination of a current path and a standby path connecting the ends of each demand pair in each time zone and variables indicating the capacity to be assigned to each link. The method solves the problem under a constraint that the total of the indicator values for the request pair must be 1 and under a constraint that either the current path or the standby path is used for each time zone, each state, and each request pair and that the total of the demand capacities of all the paths going through a link ought not to exceed the capacity of the link.

The principle of the present invention is described below. In the present invention, the following mathematical programming problem is solved under the following constraint. That is, a candidate or candidates for the combination of a current path and a standby path (or paths) to be used by each demand pair is/are given beforehand, and the variables of the objective function(s) contain an indicator indicating whether or not each candidate is used and/or the capacity to be assigned to a current path and a standby path(or paths) in each combination. Using those variables a mathematical programming problem is established which contains a constraint that a current path has a capacity to be assigned to the current path in case where it is not affected by a network failure, that a standby path has a capacity to be assigned to the standby path in case where the corresponding current path is affected by a network failure, and that the total of the capacities of the paths accommodated by a link does not exceed the capacity of the link. The variables and constraint formula are specified for each time zone and for each direction.

The method according to the present invention sets up the variables for a combination(s) of a current path and a standby path (or paths), making it possible for a standby path to be assigned to a current path regardless of the failure state. In addition, optimizing a current path to be used and a standby path at the same time reduces the cost.

The method according to the present invention, which considers a different demand capacity for each time zone and a direction, allows a plurality of demand pairs to share a link capacity among different failures, different time zones, and different directions.

DESCRIPTION OF THE PREFERRED EMBODIMENTS

Figure 1:
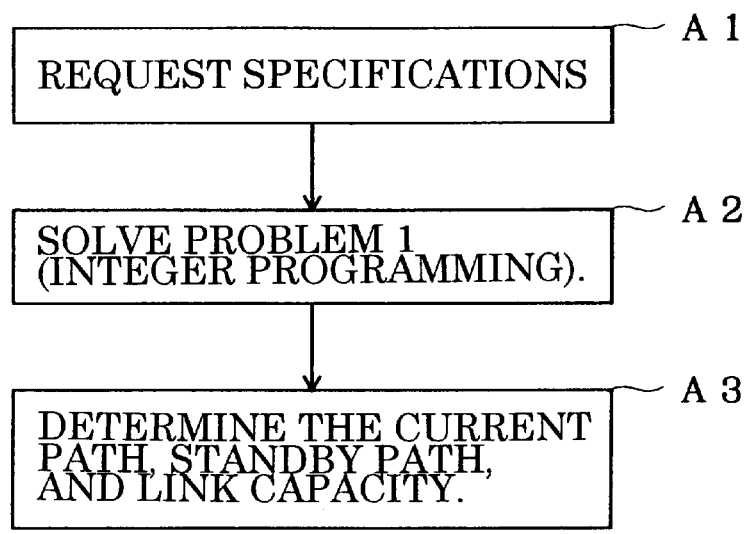
FIG. 1 is a flowchart explaining a first embodiment of the present invention.

Referring to the attached drawings, there is shown a preferred embodiment of the present invention.

First Embodiment

A first embodiment according to the present invention is explained. In this embodiment, a failure state in which only one standby path can manage the failure, being provided for a current path used by each demand pair.

The following symbols are used to formulate this problem.

First, symbols used for constants are explained.

$h=1, \ldots, H$: Number assigned to an assumed time zone. This number is assigned considering the fact that the demand capacity varies with time.

$i_m=1, \ldots, I_m$: Number assigned to a candidate for the current path used by a demand pair m.

$j_m=1, \ldots, I_m$: Number assigned to a candidate for a standby path used by a demand pair m.

$n=1, \ldots, N$: Number assigned to a node $\mu$: Represents a node capacity augmentation unit. For example, this is the number of ports of a device to be installed in the node.

$\gamma$: Node cost to link cost ratio $v_m^{Nh}$: Demand capacity to a current path of a demand pair m in a time zone h $v_{mP}^{h}$: Demand capacity to a standby path of a demand pair m in a time zone h $g_{im}$ l: Indicator assuming "1" when path in is accommodated by link 1, and "0" if not.

$h_1^n$: Indicator assuming "1" when link 1 is connected to node n, and "0" when link 1 is not connected to node n.

$o_m^n$: Indicator assuming "1" when the demand pair m contains node n, and "0" when the demand pair m does not contain node n.

$f_1^s$: Indicator assuming "1" when link 1 is normal in a state s, and "0" when link 1 is in a failure state.

For example, in the double link failure state s in which both $l_1$ and $l_2$ are in the failure state at the same time, $f_{l1}^s=f_{l2}^s=0$ and other 1–2 links are $f_l^s=1$.

When s contains a node failure, $f_l^s=0$ for all a links 1 which end at that node.

$\pi_{im}^s$: Indicator assuming "1" when a path im is not affected by a network failure in a state s, and "0" when the path is affected by the network failure. It is formulated as shown in formula 6:

$$\pi_{i_m}^s = \prod_{l \in \{l \mid g_{i_m}^l = 1\}} f_l^s \tag{6}$$

$(s=0, \ldots, S, \ m=1, \ldots, M, \ i_m = 1, \ldots, I_m)$

Variables are as follows:

$e_n$: Integer variable representing the total of capacity augmentation units at node n. The total capacity of a node is given as $\mu\, e_n$.

$r_{i_m j_m}^h$: Integer variable assuming "1" when a demand pair m uses a combination of a current path im and a standby path jm in a time zone h, and "0" when the demand pair m does not use the combination.

With the use of the above symbols, the network design method used in the first embodiment of the present invention sets up the following integer programming ([problem 1.0]). An integer programming is one type of the linear programming in which variables can assume only integers.

In setting up this problem, a plurality of candidates for combinations, each composed of a current path and a standby path, are provided in advance. In each candidate, it is assumed that two paths will not be affected by a failure at the same time in each of assumed failure states.

For example, assume all-the-independent-failure state where only one failure occur(s) in the links in a demand pair at the same time (this failure state is called a single link failure). In this case, when there are two paths, A and B, for a demand pair which are not accommodated in the same link, there are two candidates for a combination of (current path, standby path): (A, B) and (B, A).

[Problem 1.0]
[Formula 3]

$$\text{minimize} \sum_{l=1}^{L} a_l d_l + \gamma \sum_{n=1}^{N} e_n \tag{7}$$

subject to $$\sum_{m=1}^{M} \sum_{j_m=1}^{I_m} \sum_{i_m=1}^{I_m} \{g_{i_m}^l \pi_{i_m}^s v_m^{Nh} + g_{j_m}^l (1-\pi_{i_m}^s) v_m^{Fh}\} r_{i_m j_m}^h \le f_l^s \omega d_l \tag{8}$$

$(h=1,\ldots,H, \ s=0,\ldots,S, \ l=1,\ldots,L)$ $$\sum_{m=1}^{M} o_m^n v_m^h / \omega + \sum_{l=1}^{L} h_l^n d_l \le \mu e_n \ (h=1,\ldots,H, \ n=1,\ldots,N) \tag{9}$$

$$\sum_{j_m=1}^{I_m} \sum_{i_m=1}^{I_m} r_{i_m j_m}^h = 1 \ (h=1,\ldots,H, \ m=1,\ldots,M) \tag{10}$$

$d_l \ge 0 (l=1, \ldots, L)$ \hfill (11)

$e_n \ge 0 (n=1, \ldots, N)$ \hfill (12)

$r_{i_m j_m}^h \ge 0 (h=1, \ldots, H, \ m=1, \ldots, M, \ i_m j_m=1, \ldots, I_m j_m \ne i_m)$ \hfill (13)

The number of variables in the above problem 1.0 is given by the formula (14) shown below, and the number of constraint formulas except for lower limits of variables is given by the formula (15) shown below.

$$L + N + H \sum_{m=1}^{M} I_m (I_m - 1) \tag{14}$$

$$H\{(S+1)L+N+M\} \tag{15}$$

The above formula (7) is an objective function which minimizes the total of the costs of the capacities allocated to links and nodes.

The above formula (9) is a constraint indicating that the total of the link capacity units of the links terminating at each node does not exceed the total capacity of the node.

The formula (8) indicates the following condition where the path $i_m$ is a current path and the path $j_m$ is a standby path. The condition is that if path $i_m$ is accommodated by link l ($g_{im}^l=1$) and if the path is not affected by a network failure in a state s ($\pi_{im}^s=1$), then the demand capacity of $v_m^h$ for the current path is assigned; if path $j_m$ is accommodated by link l ($g_{jm}^l=1$) and if the path $i_m$ is affected by a network failure in the state s ($1-\pi_{im}^s=1$), then the demand capacity of $v_m^h$ for the standby path is assigned; and the total of the capacities for all the demand pairs, each composed of the current path and the standby path, does not exceed the total capacity $\omega\, d_1$ if the link 1 is normal in the state s.

The above formula (10) indicates a condition that, for each time zone and for each network state, the demand pair m uses any one combination of a current path and a standby path.

In the first embodiment of the present invention, the design problem is formulated under the prerequisite that all the resources of each link via which the current path passes are released when the link is affected by a failure. A first variation of this first embodiment is a variation of the above formula (8) in which the resource are not released.

First, in case where $i_m$ is a current path, $\phi_{im}^s$ is calculated by the formula (16) shown below, where $\phi_{im}^s$ is an indicator which is set to "1" when the path im passes through a normal link 1 and when at least one of the other links to pass except the link l has a failure in the state s, and which is set to "0" when all the other links have no failure.

$$\phi_{i_m}^{ls} = g_{i_m}^l f_l^s \left(1 - \prod_{l' \in \{l' | g_{i_m}^{l'} = 1, l' \neq l\}} f_{l'}^s \right) = g_{i_m}^l (f_l^s - \pi_{i_m}^s) \quad (16)$$

$$(s = 0, \ldots, S, \quad m = 1, \ldots, M, \quad i_m = 1, \ldots, I_m)$$

Then, for the normal link l in the time zone of h and in the state s, the resources occupied by the link l are given by the formula (17) given below if the link does not release the resources even when at least one of the links is affected by a failure.

$$g_{im}^l \pi_{im}^s v_m^{Nh} + \phi_{im}^{ls} v_m^{Nh} = g_{im}^l f_l^s v_m^{Nh} (s=0, \ldots, S, h=1, \ldots, H, l=1, \ldots, L, m=1, \ldots, M) \quad (17)$$

The total of the capacities of the paths in the state s and in the time zone h must not exceed the capacity of a link. Thus, when the demand pair, which is affected by a network failure on the current path, does not release the resources of a link via which the current path passes, the above formula (8) is replaced by the following formula (18).

$$\sum_{m=1}^{M} \sum_{j_m=1}^{I_m} \sum_{i_m=1}^{I_m} \{g_{i_m}^l f_l^s v_m^{Nh} + g_{j_m}^l (1 - \pi_{i_m}^s) v_m^{Fh}\} r_{i_m j_m}^h \leq f_l^s \omega d_l \quad (18)$$

$$(h = 1, \ldots, H, \quad s = 0, \ldots, S, \quad l = 1, \ldots, L)$$

This may also be explained as follows. Because the current path which passes a link does not release the resources even when at least one of the other links through which the current path passes has a failure, it can be explained that $\pi_{im}^S$ is replaced by $f_{im}^s$ in the first term on the left-hand side of the above formula (8).

A second variation of the first embodiment of the present invention is that, when a current path $i_m = i_m^0$ (m=1, ..., M) and a capacity augmentation unit $d_l^0$ (l=1, ..., L) of each link used to accommodate the current path are given, the number of capacity augmentation units of each link to accommodate the current path and the standby path, as well as a standby path in each demand pair to be used for the current path, are obtained. To do so, the above formula (10) is replaced by the formula (19) shown below, and the above formula (11) by the formula (20) shown below.

$$\sum_{j_m=1}^{I_m} r_{i_m^0 j_m}^h = 1 \ (h = 1, \ldots, H, \quad m = 1, \ldots, M) \quad (19)$$

$$d_l \geq d_l^0 (l=1, \ldots, L) \quad (20)$$

A third variation of the first embodiment of the present invention is that, when a network failure occurs (s=1, ..., S), the demand capacity of the current path not affected by the failure is reduced by $\beta_m$ (<1) for each demand pair in order to reduce the cost. To do so, the above formula (8) is replaced by the formula (21) shown below.

$$\sum_{m=1}^{M} \sum_{j_m=1}^{I_m} \sum_{i_m=1}^{I_m} g_{i_m}^l v_m^{Nh} r_{i_m j_m}^h \leq \omega d_l \ (h = 1, \ldots, H, \quad l = 1, \ldots, L) \quad (21)$$

$$\sum_{m=1}^{M} \sum_{j_m=1}^{I_m} \sum_{i_m=1}^{I_m} \{g_{i_m}^l \pi_{i_m}^s \beta_m v_m^{Nh} + g_{j_m}^l (1 - \pi_{i_m}^s) v_m^{Fh}\} r_{i_m j_m}^h \leq f_l^s \omega d_l$$

$$(h = 1, \ldots, H, \quad s = 1, \ldots, S, \quad l = 1, \ldots, L)$$

Next, an example of the first embodiment of the present invention is described with reference to FIG. 1.

First, a network topology, all patterns of failures including up to only single link failures, demand capacities for the current path and standby path of each demand pair in each time zone, and a candidate for combination of a current path and a standby path of each demand pair are given (step A1).

Next, based on the above condition, integer programming shown in the above problem 1.0 is solved (step A2).

From this solution, the following is obtained for the time zone h and demand pair m. That is, the path $i_m$ corresponding to $\pi_{i_m j_m}^h = 1$ is set as a current path and the path $j_m$ is set as a standby path, where $d_l$ is the number of capacity augmentation units of the link l (step 3).

In the first embodiment, the method considers the demand capacity which varies according to the time zone of each demand pair and, at the same time, selects the current path and standby path at the same time, allowing to design a network at a low cost.

Second Embodiment

Next, a second embodiment according to the present invention is explained. As in the first embodiment, the second embodiment assumes that a demand pair uses only one current path. The difference is that the first embodiment is for the failure that can be managed by one standby path, while the second embodiment is for an assumed failure that requires to use the first standby path and the second standby path. Here, the "second standby path" is a path that will be set up when both the current path and the first standby path are affected by a network failure.

The following symbols are defined for the second standby path:

$k_m = 1, \ldots, I_m$: Number assigned to the second standby path used by the demand pair m $r_{imjmkm}^h$: Integer variable which is set to "1" in case where the demand pair m uses the path im as a current path, the path jm as the first standby path, and the path km as the second standby path; and is set to "0" in other cases.

With the use of the above symbols, the network design method used in the second embodiment of the present invention sets up the following integer programming.

In setting up this problem, a plurality of candidates for combinations, each composed of a current path, a first standby path, and a second standby path, are provided in advance. In each candidate, it is presumed that three paths will not be affected by a failure at the same time.

For example, assume that only two failures occur in the links in a demand pair at the same time (this failure state is called a double link failure). In this case, when there are three paths, A, B and C, for a demand pair which are not accommodated in the same link, there are six candidates for a combination of (current path, first standby path, second standby path): (A, B, C), (A, C, B), (B, A, C), (B, C, A), (C, A, B), and (C, B, A).

[Problem 2.0]

[数10]

$$\text{minimize} \sum_{l=1}^{L} a_l d_l + \gamma \sum_{n=1}^{N} e_n \quad (22)$$

subject to $$\sum_{m=1}^{M} \sum_{k_m=1}^{I_m} \sum_{j_m=1}^{I_m} \sum_{i_m=1}^{I_m} \{g_{i_m}^l \pi_{i_m}^s v_m^{Nh} + g_{j_m}^l (1-\pi_{i_m}^s) \pi_{j_m}^s v_m^{Fh} + \quad (23)$$

$$g_{k_m}^l (1-\pi_{i_m}^s)(1-\pi_{j_m}^s) v_m^{Fh}\} \times r_{i_m j_m k_m}^h \leq f_l^s \omega d_l$$

$$(h=1,\ldots,H, \quad s=0,\ldots,S, \quad l=1,\ldots,L)$$

$$\sum_{m=1}^{M} o_m^n v_m^h / \omega + \sum_{l=1}^{L} h_l^n d_l \leq \mu e_n \ (h=1,\ldots,H, \quad n=1,\ldots,N) \quad (24)$$

$$\sum_{k_m=1}^{I_m} \sum_{j_m=1}^{I_m} \sum_{i_m=1}^{I_m} r_{i_m j_m k_m}^h = 1 \ (h=1,\ldots,H, \quad m=1,\ldots,M) \quad (25)$$

$$d_l \geq 0 (l=1,\ldots,L) \quad (26)$$

$$e_n \geq 0 (n=1,\ldots,N) \quad (27)$$

$$r_{i_m j_m k_m}^h \geq 0 (h=1,\ldots,H, m=1,\ldots,M, i_m, j_m, k_m=1,\ldots,I_m, k_m \neq j_m \neq i_m) \quad (28)$$

The numbers of variables in this problem are given by the formula (29) shown below, and the number of constraint formulas except for lower limits of variables is given by the formula (30) shown below.

$$L+N+H\sum_{m=1}^{M} I_m(I_m-1)(I_m-2) \quad (29)$$

$$H\{(S+1)L+N+M\} \quad (30)$$

A first variation of the second embodiment is that, in case where the current path passing through a normal link does not release the resources even if it is affected by a failure in one of the other links, the above formula (23) is replaced by the following formula (31) as in the first variation of the first embodiment.

$$\sum_{m=1}^{M} \sum_{k_m=1}^{I_m} \sum_{j_m=1}^{I_m} \sum_{i_m=1}^{I_m} \{g_{i_m}^l f_l^s v_m^{Nh} + g_{j_m}^l (1-\pi_{i_m}^s) \pi_{j_m}^s v_m^{Fh} + \quad (31)$$

$$g_{k_m}^l (1-\pi_{i_m}^s)(1-\pi_{j_m}^s) v_m^{Fh}\} \times r_{i_m j_m k_m}^h \leq f_l^s \omega d_l$$

$$(h=1,\ldots,H, \quad s=0,\ldots,S, \quad l=1,\ldots,L)$$

A second variation of the second embodiment of the present invention is that, in case where a current path $i_m = i_m^0$ (m=1,..., M) and a capacity augmentation unit $d_l^0$ of each link used to accommodate the current path are given, the first standby path, the second standby path, and the number of capacity augmentation units of each link for accommodating them in each demand pair are obtained. To do so, the above formula (25) is replaced by the formula (32) shown below, and the above formula (26) by the formula (33) shown below.

$$\sum_{k_m=1}^{I_m} \sum_{j_m=1}^{I_m} r_{i_m^0 j_m k_m}^h = 1 \ (h=1,\ldots,H, \quad m=1,\ldots,M) \quad (32)$$

$$d_l \geq d_l^0 (l=1,\ldots,L) \quad (33)$$

A third variation of the second embodiment of the present invention is that, in case where a network failure occurs (s=1,..., S), the demand capacity of the current path not affected by the failure is reduced by $\beta_m$ (<1) for each demand pair in order to reduce the cost. To do so, the above formula (23) is replaced by the formulas (34) and (35) shown below.

$$\sum_{m=1}^{M} \sum_{k_m=1}^{I_m} \sum_{j_m=1}^{I_m} \sum_{i_m=1}^{I_m} g_{i_m}^l v_m^{Fh} r_{i_m j_m k_m}^h \leq \omega d_l \ (h=1,\ldots,H, \quad l=1,\ldots,L) \quad (34)$$

$$\sum_{m=1}^{M} \sum_{k_m=1}^{I_m} \sum_{j_m=1}^{I_m} \sum_{i_m=1}^{I_m} \{g_{i_m}^l \pi_{i_m}^s \beta_m v_m^{Nh} + g_{j_m}^l (1-\pi_{i_m}^s) \pi_{j_m}^s v_m^{Fh} + \quad (35)$$

$$g_{k_m}^l (1-\pi_{i_m}^s)(1-\pi_{j_m}^s) v_m^{Fh}\} \times r_{i_m j_m k_m}^h \leq f_l^s \omega d_l$$

$$(h=1,\ldots,H, \quad s=1,\ldots,S, \quad l=1,\ldots,L)$$

Figure 2:
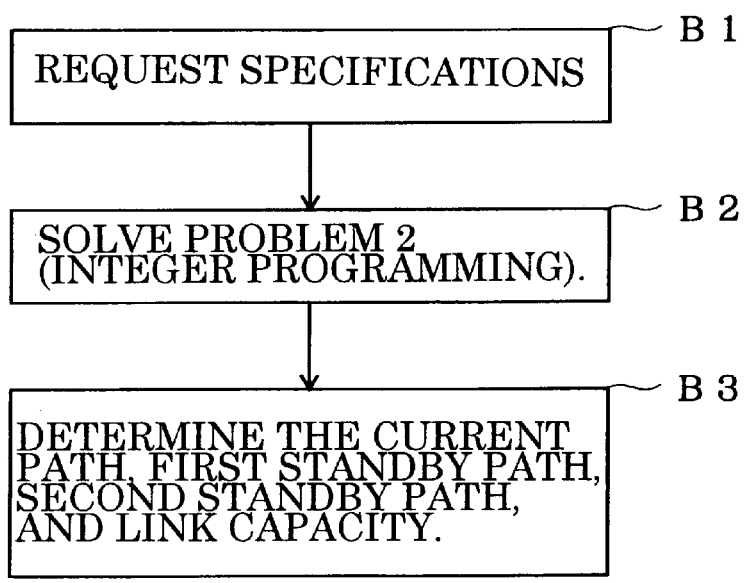
FIG. 2 is a flowchart explaining a second embodiment of the present invention.

Next, the second embodiment of the present invention is described with reference to FIG. 2.

First, a network topology, all patterns of failures including up to double link failures, and in each time zone, the demand capacities of the current path and standby path of each demand pair, and candidates for combinations of the current path, the first standby path, and the second standby path of each demand pair are given (step B1).

Next, based on the above condition, integer programming shown in the above problem 2.0 is solved (step B2).

From the solution of the problem 2.0, the following is obtained for the time zone h and demand pair m. That is, the path $i_m$ corresponding to $\pi_{i_m j_m k_m}^h = 1$ is set as the current path, the path $j_m$ is set as the first standby path of the path $i_m$, and the path $k_m$ is set as the second standby path of the path $i_m$, where di is the number of capacity augmentation units of the link l.

In actual operation, when the current path is affected by a network failure, the first standby path is used; when both the current path and the first standby path are affected by a network failure, the second standby path is used.

Thus, in the second embodiment of the present invention, the method considers the demand capacity which varies according to the time zone of each demand pair and, at the same time, selects the current path, the first standby path, and the second standby path at the same time, allowing to design a network compatible with any double link failure at a low cost.

Third Embodiment

A third embodiment according to the present invention is explained.

In the above first and second embodiments, whether or not a combination of a current path and a standby path is used is treated as a variable assuming that only one current path is used in each demand pair. Under this condition, a network is designed for a failure state which requires one standby path and for another failure state which requires two standby paths.

In the third embodiment, a case is considered where a plurality of current paths may be used in each demand pair.

Namely, for combinations of current paths and standby paths that may be used by each demand pair, this is done by assigning variable capacities to the current path and standby paths, respectively.

To set up this problem, the following symbol is defined.

$c'^{h}_{i_m j_m}$: Variable representing a capacity to be assigned to the current path when a demand pair m uses a path im as the current path and a path jm as the standby path in a time zone h.

A network design method used in the third embodiment of the present invention uses the above symbol to set up mixed integer programming (problem 3.0). Mixed integer programming is a linear programming in which variables are partly integers. As with the first embodiment described above, combinations of candidate for a current path and a standby path for each demand pair is given in advance.

Problem 3.0

$$\text{minimize} \sum_{l=1}^{L} a_l d_l + \gamma \sum_{n=1}^{N} e_n \tag{36}$$

subject to $$\sum_{m=1}^{M} \sum_{j_m=1}^{I_m} \sum_{i_m=1}^{I_m} \{g^l_{i_m} \pi^s_{i_m} c^h_{i_m j_m} + g^l_{j_m}(1 - \pi^s_{i_m}) c'^h_{i_m j_m}\} \leq f^s_l \omega d_l \tag{37}$$

$(h = 1, \ldots, H, \quad s = 0, \ldots, S, \quad l = 1, \ldots, L)$ $$\sum_{m=1}^{M} o^n_m v^{Nh}_m / \omega + \sum_{l=1}^{l} h^n_l d_l \leq \mu e_n \quad (h = 1, \ldots, H, \quad n = 1, \ldots, N) \tag{38}$$

$$\sum_{j_m=1}^{I_m} \sum_{i_m=1}^{I_m} c^h_{i_m j_m} = v^{Nh}_m \quad (h = 1, \ldots, H, \quad m = 1, \ldots, M) \tag{39}$$

$(v^{Fh}_m / v^{Nh}_m) c^h_{i_m j_m} \leq c'^h_{i_m j_m}$ $(h = 1, \ldots, H, \quad m = 1, \ldots, M, \quad i_m, j_m = 1, \ldots, I_m j_m \neq i_m)$ \hfill (40)

$d_l \geq 0 (l=1, \ldots, L)$ \hfill (41)

$e_n \geq 0 (n=1, \ldots, N)$ \hfill (42)

$c_{i_m j_m}{}^h, c_{i_m j_m}{}'^h \geq 0 (h=1, \ldots, H, m=1, \ldots, M, i_m j_m=1, \ldots, I_m, j_m \neq i_m)$ \hfill (43)

The number of variables of this problem is given by the formula (44) shown below, and the constraint except for lower limits of variables is given by the formula (45) shown below.

$$L + N + 2H \sum_{m=1}^{M} I_m(I_m - 1) \tag{44}$$

$$H\left\{(S+1)L + N + M + \sum_{m=1}^{M} I_m(I_m - 1)\right\} \tag{45}$$

The above formula (40) indicates the condition that the demand capacity $c'^{h}_{i_m j_m}$ assigned to the standby path is not smaller than the capacity $c^{h}_{i_m j_m}$ assigned to the current path multiplied by the demand recovery ratio $v^{Fh}_m / v^{Nh}_m$.

A first variation of the third embodiment is a variation of the above formula (38) in case where upon failure, a current path affected by a failure does not release the resources used by a link accommodated by the current path in a link not affected by the failure.

The total of the capacities to be accommodated in a state s and in a time zone h must not exceed the capacity of the link. Therefore, when a demand pair whose current path is affected by a network failure does not release the resources of the current path on a link through which the current path passes, the above formula (37) is replaced by the following formula (46).

$$\sum_{m=1}^{M} \sum_{j_m=1}^{I_m} \sum_{i_m=1}^{I_m} \{g^l_{i_m} f^s_l c^h_{i_m j_m} + g^l_{j_m}(1 - \pi^s_{i_m}) c'^h_{i_m j_m}\} \leq f^s_l \omega d_l \tag{46}$$

$(h = 1, \ldots, H, \quad s = 0, \ldots, S, \quad l = 1, \ldots, L)$

This second variation of the third embodiment of the present invention is as follows: When a current path $i_m = i_m^0$ (m=1, \ldots, M) and a number of capacity augmentation units $d^0_l$ (l=1, \ldots, L) of each link used to accommodate the current path are given in each demand pair, the number of capacity augmentation units of each link for accommodating the current path and the standby path, as well as the standby path, are determined. To do so, the above formula (39) is replaced by the formula (47) shown below.

$$\sum_{j_m=1}^{I_m} c^h_{i^0_m j_m} = v^{Nh}_m \quad (h = 1, \ldots, H, \quad m = 1, \ldots, M) \tag{47}$$

Or, the above formula (41), which is a constraint on the link capacity, is replaced by the following formula (48).

$d_l \geq d_l^0 (l=1, \ldots, L)$ \hfill (48)

This third variation of the third embodiment of the present invention is as follows: When a network failure occurs (s=1, \ldots, S), it is considered that the demand capacity of the current path not affected by the failure is reduced by $\beta_m$ (<1) for each demand pair in order to design at a reduced cost, as with the third variation of the first embodiment. To do so, the above formula (37) is replaced by the formulas (49) and (50) shown below.

$$\sum_{m=1}^{M} \sum_{j_m=1}^{I_m} \sum_{i_m=1}^{I_m} g^l_{i_m} c^h_{i_m j_m} \leq \omega d_l \quad (h = 1, \ldots, H, \quad l = 1, \ldots, L) \tag{49}$$

$$\sum_{m=1}^{M} \sum_{j_m=1}^{I_m} \sum_{i_m=1}^{I_m} \{g^l_{i_m} \pi^s_{i_m} \beta_m c^h_{i_m j_m} + g^l_{j_m}(1 - \pi^s_{i_m}) c'^h_{i_m j_m}\} f^s_l \omega d_l \tag{50}$$

$(h = 1, \ldots, H, \quad s = 1, \ldots, S, \quad l = 1, \ldots, L)$

Figure 3:
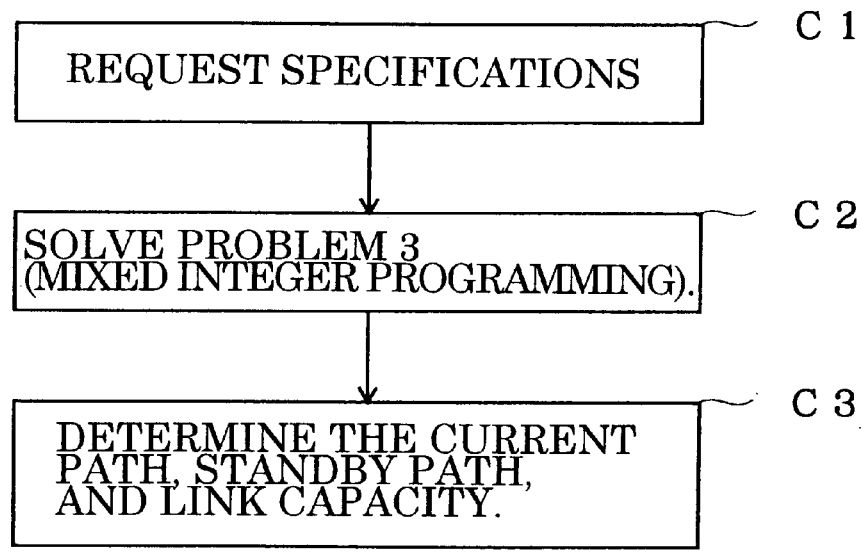
FIG. 3 is a flowchart explaining a third embodiment of the present invention.

Next, an example of the third embodiment of the present invention is described with reference to FIG. 3.

First, a network topology, patterns of all failures including up to single link failures, and, in each time zone, the demand capacities of the current path and standby path of each demand pair and candidates for combinations of the current path and a standby path for each demand pair are given (step C1).

Next, based on the above condition, mixed integer programming shown in the above problem 3.0 is solved (step C2).

From this solution, the following is obtained for the time zone h and demand pair m where $d_1$ is a number of the capacity augmentation units of link l. That is, the capacity $c^h_{i_m j_m}$ is assigned to a path im as a current path and, if a path $j_m$ is set as a corresponding standby path, $c'^h_{i_m j_m}$ is assigned to it (step C3).

Because the third embodiment allows a plurality of current paths to be used in a demand pair, a network which is compatible with all single link failures may be designed at a lower cost than in the method described in the first embodiment.

Fourth Embodiment

Next, a fourth embodiment according to the present invention is explained. As in the third embodiment described above, a plurality of current paths may be set up in each demand pair. And, as in the second embodiment, the method used in the fourth embodiment is aimed at coping with a failure which requires preparation for not only the first standby path but the second standby path.

The following symbol is defined for this embodiment.

$c^h_{imjmkm}$: Variable representing a capacity to be assigned to a current path in case where in a time zone h, a demand pair m uses a path im as the current path, a path jm as the first standby path, and path km as the second standby path.

With the use of the above symbols, the network design method used in the fourth embodiment of the present invention sets up the following mixed integer programming (problem 4.0) and solves it. Here, as with the second embodiment candidates for combinations of the current path, the first standby path, and the second standby path are given.

Problem 4.0

$$\text{minimize} \sum_{l=1}^{L} a_l d_l + \gamma \sum_{n=1}^{N} e_n \quad (51)$$

subject to $$\sum_{m=1}^{M} \sum_{k_m=1}^{l_m} \sum_{j_m=1}^{l_m} \sum_{i_m=1}^{l_m} \{g^l_{i_m} \pi^s_{i_m} c^h_{i_m j_m k_m} + g^l_{j_m}(1-\pi^s_{i_m})\pi^s_{j_m} c^h_{i_m j_m k_m} + \quad (52)$$

$$g^l_{k_m}(1-\pi^s_{i_m})(1-\pi^s_{j_m})c'^h_{i_m j_m k_m}\} \le f^s_l \omega d_l$$

$(h=1,\ldots,H, \ s=0,\ldots,S, \ l=1,\ldots,L)$ $$\sum_{m=1}^{M} o^n_m v^{Nh}_m / \omega + \sum_{l=1}^{L} h^n_l d_l \le \mu e_n \ (h=1,\ldots,H, \ n=1,\ldots,N) \quad (53)$$

$$\sum_{k_m=1}^{l_m} \sum_{j_m=1}^{l_m} \sum_{i_m=1}^{l_m} c^h_{i_m j_m k_m} = v^{Nh}_m \ (h=1,\ldots,H, \ m=1,\ldots,M) \quad (54)$$

$$(v^{Fh}_m / v^{Nh}_m) c^h_{i_m j_m k_m} \le c'^h_{i_m j_m k_m}$$

$(h=1,\ldots,H, \ m=1,\ldots,M, \ i_m, j_m k_m=1,\ldots,I_m, \ k_m \ne j_m \ne i_m)$ (55)

$d_l \ge 0 (l=1,\ldots,L)$ (56)

$e_n \ge 0 (n=1,\ldots,N)$ (57)

$c_{imjmkm}{}^h, c'_{imjmkm}{}^h \ge 0 (h=1,\ldots,H, m=1,\ldots,M, i_m j_m, k_m=1,\ldots,I_m, k_m \ne j_m \ne i_m)$ (58)

The number of variables in this problem is given by the formula (59) shown below, and the number of constraint formulas except for lower limits of variables is given by the formula (60) shown below.

$$L + N + 2H \sum_{m=1}^{M} I_m(I_m-1)(I_m-2) \quad (59)$$

$$H\left\{L(S+1) + N + M + \sum_{m=1}^{M} I_m(I_m-1)(I_m-2)\right\} \quad (60)$$

Next, a first variation of the fourth embodiment is performed as follows: In case where a current path passing through a normal link does not release the resources even if the current path is affected by a failure in one of the other links, the above formula (52) is replaced by the following formula (61).

$$\sum_{m=1}^{M} \sum_{k_m=1}^{l_m} \sum_{j_m=1}^{l_m} \sum_{i_m=1}^{l_m} \{g^l_{i_m} f^s_l c^h_{i_m j_m k_m} + g^l_{j_m}(1-\pi^s_{i_m})\pi^s_{j_m} c'^h_{i_m j_m k_m} + \quad (61)$$

$$g^l_{k_m}(1-\pi^s_{i_m})(1-\pi^s_{j_m})c'^h_{i_m j_m k_m}\} \le f^s_l \omega d_l$$

$(h=1,\ldots,H, \ s=0,\ldots,S, \ l=1,\ldots,L)$

A second variation of the fourth embodiment of the present invention is performed as follows as with the second variation of the third embodiment: In case where a current path $i_m = i_m^0$ (m=1, ..., M) and a number of capacity augmentation unit $d_l^0$ (l=1, ..., L) to accommodate the current path are given for each demand pair, there are obtained the first standby path and the second standby path of each demand pair and the number of capacity augmentation units of each link for accommodating them.

To do so, the above formula (54) is replaced by the following formula (62).

$$\sum_{k_m=1}^{l_m} \sum_{j_m=1}^{l_m} c^h_{i_m^0 j_m k_m} = v^{Nh}_m \ (h-1,\ldots,H, \ m=1,\ldots,M) \quad (62)$$

And, the above formula (56), the constraint on the link capacity, is replaced by the formula (63).

$d_l \ge d_1^0 (l=1,\ldots,L)$ (63)

A third variation of the fourth embodiment of the present invention is performed as follows as in the case with the third variation of the first embodiment: In case where a network failure occurs (s=1, ..., S), the demand capacity of the current path not affected by the failure is reduced by $\beta_m$ (<1) for each demand pair in order to reduce the cost. To do so, the above formula (52) is replaced by the formulas (64) and (65) shown below.

$$\sum_{m=1}^{M} \sum_{k_m=1}^{l_m} \sum_{j_m=1}^{l_m} \sum_{i_m=1}^{l_m} g^l_{i_m} c^h_{i_m j_m k_m} \le \omega d_l \ (h=1,\ldots,H, \ l=1,\ldots,L) \quad (64)$$

$$\sum_{m=1}^{M} \sum_{k_m=1}^{l_m} \sum_{j_m=1}^{l_m} \sum_{i_m=1}^{l_m} \{g^l_{i_m} \pi^s_{i_m} \beta_m c^h_{i_m j_m k_m} + g^l_{j_m}(1-\pi^s_{i_m})\pi^s_{j_m} c'^h_{i_m j_m k_m} + \quad (65)$$

$$g^l_{k_m}(1-\pi^s_{i_m})(1-\pi^s_{j_m})c'^h_{i_m j_m k_m}\} \le f^s_l \omega d_l$$

$(h=1,\ldots,H, \ s=1,\ldots,S, \ l=1,\ldots,L)$

Figure 4:
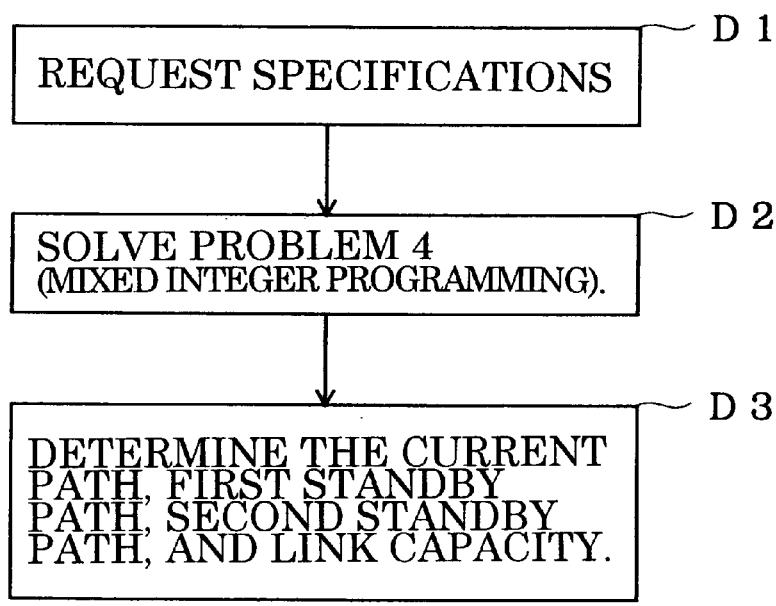
FIG. 4 is a flowchart explaining a fourth embodiment of the present invention.
Figure 5:
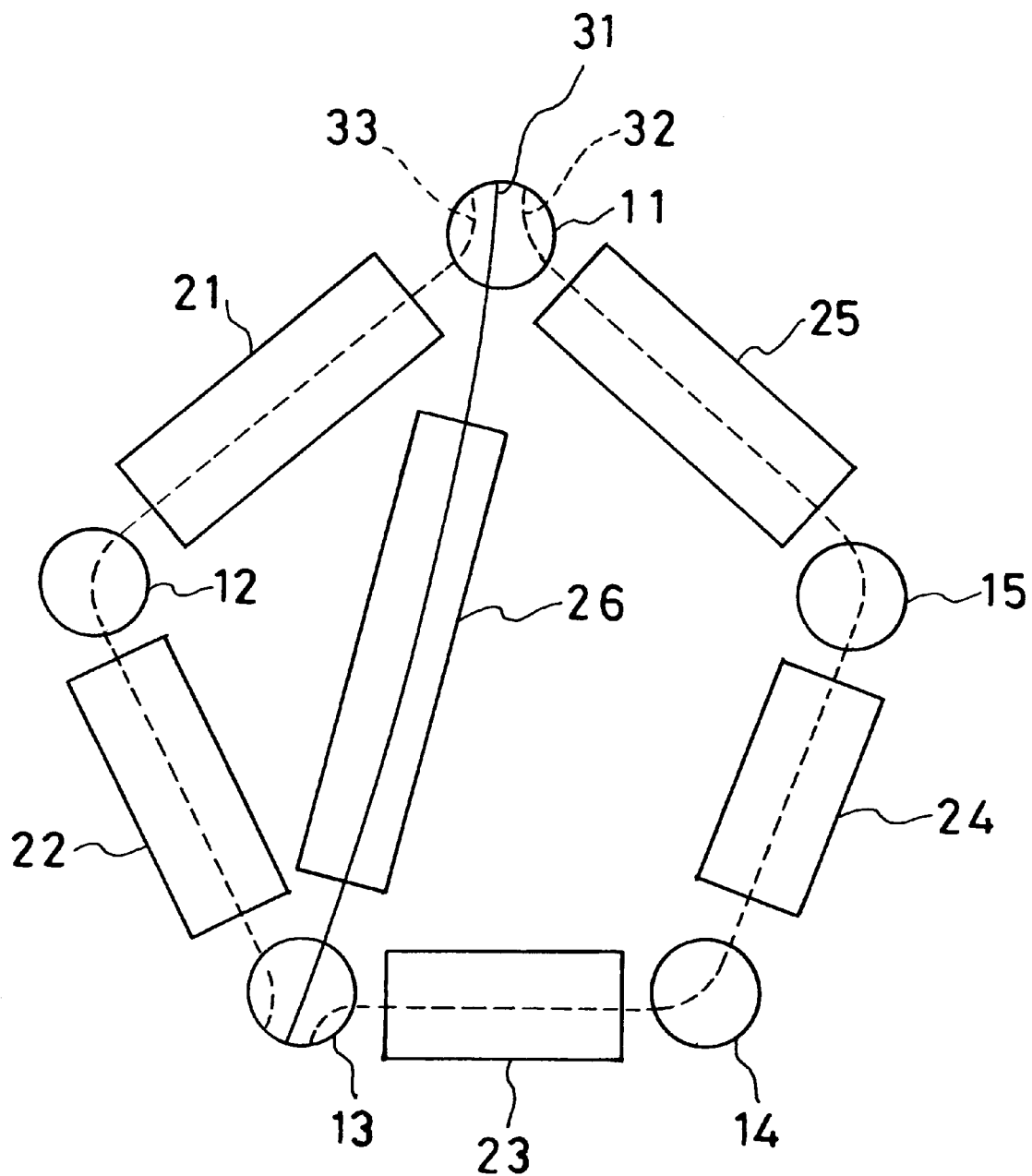
FIG. 5 is a diagram explaining a network to be designed.

Next, an example for the fourth embodiment of the present invention is described with reference to FIG. 4.

First, a network topology, all patterns of failures including up to double link failures, and in each time zone, the demand capacities of the current paths and standby paths of each demand pair and candidates for combinations of the current path the first standby path and the second standby path for each demand pair are given (step D1).

Next, based on the above condition, mixed integer programming shown in the above problem 4.0 is solved (step D2).

From the solution of the problem 4.0, the following is obtained for the time zone h and demand pair m, where $d_1$ is the number of capacity augmentation units of the link 1. That is, the capacity $c^h_{i_m j_m k_m}$ is assigned to a path $i_m$ as the current path and, when path $j_m$ is set as the first standby path and path $k_m$ is set as the second standby path, the capacity $c'^h_{i_m j_m k_m}$ is assigned to them, respectively (step D3).

In the fourth embodiment of the present invention, the method allows a plurality of current paths to be used, making it possible for a network, which is compatible with, e.g., an independent double-failure, to be built at a cost lower than the second embodiment.

Lastly, variations common to the first to fourth embodiments are described. In a case where the demand capacity varies according to the path direction, numbers, constants, and variables are set up as follows:

That is, numbers are assigned to nodes. And, for demand pairs, paths, and links, even numbers are assigned in ascending order of the node numbers, and odd numbers in descending order of the node numbers, respectively. Thus, numbers are assigned as follows:

Numbers assigned to demand pairs: $2m, 2m+1$, (m=1, ..., M)

Numbers assigned to links: $2l, 2l+1$ (l=1, ..., L)

Numbers assigned to current paths: $2i_m, 2i_m+1$ ($i_m$=1, ..., $I_m$)

Numbers assigned to first standby paths: $2j_m, 2j_m+1$ ($j_m$=1, ..., $I_m$),

Numbers assigned to second standby paths: $2k_m, 2k_m+1$ ($k_m$=1, ..., $I_m$),

Variables are assigned accordingly as follows:

$$d_{2l}, d_{2l+1}$$

$$r^h_{2i_m 2j_m 2k_m}, r^h_{2i_m+1 2j_m+1 2k_m+1}$$

or $$c^h_{2i_m 2j_m 2k_m}, c^h_{2i_m+1 2j_m+1 2k_m+1}$$

and the demand capacity, which generally varies, is represented as:

$$v^{Nh}_{2m}, v^{Nh}_{2m+1}, v^{Fh}_{2m}, v^{Fh}_{2m+1}$$

The cost coefficient is given as:

$$a_{2l} = a_{2l+1}$$

Normally, a path uses the same route bi-directionally. In this case, the following formula is given:

$$g^{2l}_{2i_m} = g^{2l+1}_{2i_m+1} (l=1, \ldots, L, i_m=1, \ldots, I_m) \quad (66)$$

The values of indicators are given to satisfy the above formula.

Because each path must be used bi-directionally, $$r^h_{2i_m 2j_m 2k_m} = r^h_{2i_m+1 2j_m+1 2k_m+1} (h=1, \ldots, H, m=1, \ldots, M, i_m, j_m, k_m=1, \ldots, I_m) \quad (67)$$

or $$\frac{c^h_{2i_m 2j_m 2k_m}}{v^{Nh}_{2m}} = \frac{c'^h_{2i_m+1 2j_m+1 2k_m+1}}{v^{Nh}_{2m+1}} \quad (68)$$

$(h = 1, \ldots, H, \quad m = 1, \ldots, M, \quad i_m, j_m, k_m = 1, \ldots, I_m)$ $$\frac{c'^h_{2i_m 2j_m 2k_m}}{v^{Fh}_{2m}} = \frac{c'^h_{2i_m+1 2j_m+1 2k_m+1}}{v^{Fh}_{2m+1}} \quad (69)$$

$(h = 1, \ldots, H, \quad m = 1, \ldots, M, \quad i_m, j_m, k_m = 1, \ldots, I_m)$ is used as the constraint.

In this variation, when the demand capacity differs depending upon the direction, constants and variables are set up for each direction to formulate the problem. Therefore, in comparison with a design method in which the larger one among those demand capacities is used without considering the direction, the cost is lower.

The present invention has the following advantages:

(1) The first advantage resides in that each demand pair can perform operation in a distributed, switchable control mode in which the current path is switched to a standby path when the current path is determined to be affected by a failure.

The present invention makes this control mode possible by the following features:

Each demand pair comprises a set of variables assigned to a combination of the current path and one or more standby paths;

The current path is assigned its own capacity when not affected by a network failure;

A standby path is assigned its own capacity when the corresponding current path is affected by a network failure.

In designing a network, a mathematical programming problem is solved under the constraint that the total of the capacities used by all the paths which go through a particular link does not exceed the capacity of the link. Therefore, this design method allows each of the current paths to determine a standby path for use without recourse to the respective failure of the network.

(2) The second advantage of the present invention resides in that the cost is lower than a design method in which a standby path is provided for the current path, in which the maximum demand capacity is used when the capacity varies according to the time zone, or in which the maximum demand capacity is used when capacity varies according to the direction.

This is because the present invention sets up variables for a combination of the current path and one or more standby paths, and designs a network by solving a mathematical programming problem under the constraint that the total of the capacities used by all the paths which go through a particular link does not exceed the capacity of the link. The present invention considers the current path and standby paths at the same time to optimize the cost and, at the same time, allows the link capacity to be shared among different demand pairs, failure states, time zones and directions. Thus the design is performed at an optimumly reduced cost regardless of the failure states, time zones and directions.

It should be noted that modification obvious in the art may be done without departing from the present invention within the gist and the scope as discussed herein and claimed as appended.

What is claimed is:

1. A network design method for use in a network having a plurality of nodes each terminating a path or each being a junction on the path and having a plurality of links each accommodating said path, the method comprising the steps of:

provide a plurality of combination candidates of a first to an N-th path for a demand pair composed of a pair of said nodes, N being an integer of at least 2 and said demand pair having a demand capacity;

solving a mathematical programming problem which comprises:

indicators as variables each indicating whether or not each of said demand pairs uses each of said combination candidates as a combination of a current path and any one of first to (N−1)th standby paths in one or more time zones and in each direction, a first constraint under which a total of said indicators for each of said combination candidates is 1 in said demand pair, in said one or more time zones, and in each of said directions, a capacity to be assigned to said current path accommodated by each of said links, when said current path is not affected by a failure on said network in said one or more time zones, in each of said directions, and in a normal state and each failure state of said network, a capacity to be assigned to said first standby path accommodated by said link, when said current path corresponding to said first standby path is affected by a failure on said network, a capacity to be assigned to said n-th (n=2, . . . , N−1) standby path accommodated by said link when said current path corresponding to the nth standby path and said first to (n−1)th standby paths are affected by a failure on said network, where N is an integer of at least 3, and a second constraint under which a total of the capacity of said current path accommodated by said link and capacities of said first standby path to (N−1)th standby path for said demand pair does not exceed a capacity assigned to said link; and determining a combination of said current path, any one of said first standby path to said (N−1)th standby path, and a capacity to be assigned to each of said links, for use by each of said demand pairs, in said one or more time zones and in each of said directions, based on a solution of said mathematical programming problem.

2. A network design method for use in a network having a plurality of nodes each terminating a path or each being a junction on the path and having a plurality of links each accommodating said path, the method comprising the steps of:

providing a plurality of combination candidates of a first to an N-th path for a demand pair composed of a pair of said nodes, N being an integer of at least 2 and said demand pair having a demand capacity;

solving a mathematical programming problem which comprises:

capacities to be assigned to each of said combination candidates for each of said demand pairs in one or more time zones and in each direction, each of said combination candidates being composed of a current path which is any one of a first to an N-th path and any one or more of first to (N−1)th standby paths corresponding to said current path, a first constraint under which a total of capacities to be assigned to said current path satisfies the demand capacity of said demand pair in said one or more time zones and in each of said directions, capacities each to be assigned to said current path accommodated by said link when said current path is not affected by a failure on said network in said one or more time zones, in each of said directions, and in a normal state and a failure state of said network, a capacity to be assigned to said first standby path when said current path corresponding to said first standby path is affected by a failure on said network, a capacity to be assigned to said n-th (n=2, . . . , N−1) standby path accommodated by said link when said current path and said first to (n−1)th standby paths are affected by a failure on said network, where N is an integer of at least 3, and a second constraint under which a total of said capacities of said current path and any one of said first standby path to (N−1)th standby path for said demand pair does not exceed a capacity assigned to said link; and determining a capacity to be assigned to said demand pairs and to each of said first standby path to said (N−1)th standby path, and a capacity to be assigned to each of said links, in one or more time zones and in each of said directions, based on a solution of said mathematical programming problem.

3. A computer-readable medium comprising a program for use in a network having a plurality of nodes each terminating a path or each being a junction on the path and having a plurality of links each accommodating said path, said medium having stored therein a network design program adapted for execution by a data processing system in connection with said network, said program comprising the steps of:

providing a plurality of combination candidates of a first to an N-th path for a demand pair composed of a pair of said nodes, N being an integer of at least 2 and said demand pair having a demand capacity;

solving a mathematical programming problem which comprises:

indicators as variables each indicating whether or not each of said demand pairs uses each of said combination candidates as a combination of a current path and any one of first to (N−1)th standby paths in one or more time zones and in each direction, a first constraint under which a total of said indicators for each of said combination candidates is 1 in said demand pair, in said one or more time zones, and in each of said directions, a capacity to be assigned to said current path accommodated by each of said links, when said current path is not affected by a failure on said network in said one or more time zones, in each of said directions, and in a normal state and each failure state of said network, a capacity to be assigned to said first standby path accommodated by said link, when said current path corresponding to said first standby path is affected by a failure on said network, a capacity to be assigned to said n-th (n=2, . . . , N−1) standby path accommodated by said link when said current path corresponding to the nth standby path and said first to (n−1)th standby paths are affected by a failure on said network, where N is an integer of at least 3, and a second constraint under which a total of the capacity of said current path accommodated by said link and capacities of said first standby path to (N−1)th standby path for said demand pair does not exceed a capacity assigned to said link; and determining a combination of said current path, any one of said first standby path to said (N−1)th standby path, and a capacity to be assigned to each of said links, for use by each of said demand pairs, in said one or more time zones and in each of said directions, based on a solution of said mathematical programming problem.

4. A computer-readable medium comprising a program for use in a network having a plurality of nodes each terminating a path or each being a junction on the path and having a plurality of links each accommodating said path, said medium having stored therein a network design program adapted for execution by a data processing system in connection with said network, said program comprising the steps of:

providing a plurality of combination candidates of a first to an N-th path for a demand pair composed of a pair of said nodes, N being an integer of at least 2 and said demand pair having a demand capacity;

solving a mathematical programming problem which comprises:

capacities to be assigned to each of said combination candidates for each of said demand pairs in one or more time zones and in each direction, each of said combination candidates being composed of a current path which is any one of a first to an N-th path and any one of first to (N−1)th standby paths corresponding to said current path, a first constraint under which a total of capacities to be assigned to said current path satisfies the demand capacity of said demand pair in said one or more time zones and in each of said directions, capacities each to be assigned to said current path accommodated by said link when said current path is not affected by a failure on said network in said one or more time zones, in each of said directions, and in a normal state and a failure state of said network, a capacity to be assigned to said first standby path when said current path corresponding to said first standby path is affected by a failure on said network, a capacity to be assigned to said n-th (n=2, ..., N−1) standby path accommodated by said link when said current path and said first to (n−1)th standby paths are affected by a failure on said network, where N is an integer of at least 3, a second constraint under which a total of said capacities of said current path and any one of said first standby path to (N−1)th standby path for said demand pair does not exceed a capacity assigned to said link; and determining a capacity to be assigned to said demand pairs and to each of said first standby path to said (N−1)th standby path, and a capacity to be assigned to each of said links, in one or more time zones and in each of said directions, based on a solution of said mathematical programming problem.

5. A network design method for use in a network having a plurality of nodes each terminating a path or each being a junction on the path and having a plurality of links each accommodating said path, the design method comprising the steps of:

(a) providing a network topology, a failure pattern specifying a location at which a failure occurs on the network, a demand capacity for a current path of a demand pair which is a pair of nodes, each terminating the path, in each time zone and in each direction and a demand pair for a standby path to be used when the current path is affected by the network failure, and combination candidates of a current path and a standby path in said each demand pair;

(b) solving an integer programming problem having an objective function which minimizes a cost caused by the link capacity based on information given by the preceding steps, said objective function having:

as variables indicators each indicating whether to use a combination of a current path and a standby path of each demand pair in each time zone and capacities to be assigned to each link, and a first constraint under which a total of values of said indicators of each demand pair is 1; and having a second constraint under which, in each time zone, in each network state, and in each demand pair, the current path is accommodated by a link if the current path passing through said each link is not affected by a failure, and a standby path is accommodated if the current path is affected by the failure provided that a standby path corresponding to this current path passes through said link and, as a result, a total of capacities of all paths accommodated by a link does not exceed the capacity of the link; and (c) determining, from a result of solution of the integer programming problem, link capacities as well as a current path and a standby path to be used by each demand pair in each time zone.

6. A network design method as defined in claim 5, wherein combination candidates of a current path, a standby path, and a second standby path which is used when said current path and said standby path are affected by the network failure at the same time are provided and wherein, based on the combination candidates, the integer programming problem is solved by introducing integer variables that assume a value "1" when demand pair m uses a path im as the current path, a path jm as the standby path, and a path km as the second standby path in a time zone.

7. A network design method as defined by claim 5 or 6, wherein said integer programming problem is a mixed integer programming problem which comprises a variable representing the capacity to be assigned to the current path when, in a particular time zone, the demand pair m uses the path im as the current path, uses the path jm as the standby path, and/or uses the path km as the second standby path, said mixed integer programming problem further comprising a condition that the capacity to be assigned to the standby path is not less than the capacity value assigned to the current path multiplied by a request recovery ratio, and wherein by solving the mixed integer programming problem the capacity is assigned to the current path and the standby path in each time zone and for each demand pair.

* * * * *

UNITED STATES PATENT AND TRADEMARK OFFICE
CERTIFICATE OF CORRECTION

PATENT NO. : 6,141,318  Page 1 of 2
DATED : October 31, 2000
INVENTOR(S) : Yasuhiro Miyao It is certified that error appears in the above-identified patent and that said Letters Patent is hereby corrected as shown below:

Column 11,
Line 10, Equation 23, change $$\sum_{m=1}^{M}\sum_{k_m=1}^{lm}\sum_{j_m=1}^{lm}\sum_{i_m=1}^{lm}\{g\frac{l}{i_m}\pi\frac{s}{i_m}u\frac{Nh}{m}+g\frac{l}{j_m}(1-\pi\frac{3}{i_m})\pi\frac{3}{jm}u\frac{Fh}{m}+"$$

to $$--\sum_{m=1}^{M}\sum_{k_m=1}^{lm}\sum_{j_m=1}^{lm}\sum_{i_m=1}^{lm}\{g\frac{l}{i_m}\pi\frac{s}{i_m}u\frac{Nh}{m}+g\frac{l}{j_m}(1-\pi\frac{3}{i_m})\pi\frac{3}{jm}u\frac{Fh}{m}+--.$$

Line 28, equation 28, change "$r_{imjmkm}{}^h \geq 0 (h=1,\ldots,H, m=1,\ldots,M, I_m, j_m, k_m=1,\ldots,I_m,$"

to $--r^h{}_{imjmkm}{}^h \geq 0 (h=1,\ldots,H, m=1,\ldots,M, I_m, j_m, k_m=1,\ldots,I_m,--$.

Column 12,
Lines 20-22, equation 35, change $$"\sum_{m=1}^{M}\sum_{k_m=1}^{lm}\sum_{j_m=1}^{lm}\sum_{i_m=1}^{lm}\{g\frac{l}{i_m}\pi\frac{s}{i_m}\beta_m u\frac{Nh}{m}+g\frac{l}{j_m}(1-\pi\frac{3}{i_m})\pi\frac{3}{jm}u\frac{Fh}{m}+g\frac{l}{k_m}(1-\pi\frac{3}{i_m})(1-\pi\frac{3j_m}{})u\frac{Fh}{m}\}"$$ to $$--\sum_{m=1}^{M}\sum_{k_m=1}^{lm}\sum_{j_m=1}^{lm}\sum_{i_m=1}^{lm}\{g\frac{l}{i_m}\pi\frac{s}{i_m}\beta_m u\frac{Nh}{m}+g\frac{l}{j_m}(1-\pi\frac{3}{i_m})\pi\frac{3}{jm}u\frac{Fh}{m}--.$$

Column 15,
Line 57, equation 58, change "$c_{imjmkm}{}^h, c_{imjmkm}{}^h \geq 0 (h=1,\ldots,H, m=1,\ldots,M, I_m, j_m, k_m=1,\ldots$"

to $--c^h{}_{imjmkm}, c^h{}_{imjmkm} \geq 0 (h=1,\ldots,H, m=1,\ldots,M, I_m, j_m, k_m=1,\ldots--$.

Column 17,
Line 40, change "$r_{2im2jm2km}{}^h, r_{2im+12jm+12km+1}{}^h$" to $-- r^h{}_{2im2jm2km}, r^h{}_{2im+12jm+12km+1} --.$ Line 45, change "$c_{2im2jm2km}{}^h, c_{2im+12jm+12km+1}{}^h$" to $--c^h{}_{2im2jm2km}, c^h{}_{2im+12jm+12km+1} --.$

UNITED STATES PATENT AND TRADEMARK OFFICE
CERTIFICATE OF CORRECTION

PATENT NO. : 6,141,318
DATED : October 31, 2000
INVENTOR(S) : Yasuhiro Miyao

It is certified that error appears in the above-identified patent and that said Letters Patent is hereby corrected as shown below:

Column 17, cont'd,
Line 58, equation 66, change "$g_{2im}{}^{21}=g_{2im+1}{}^{21+1}(1=1,\ldots, L, I_m=1,\ldots,Im)$" to
-- $g^{21}{}_{2im}=g^{2+1}{}_{2im+1}(1=1,\ldots, L, I_m=1,\ldots,Im)$ --.

Line 66, equation 67, change "$r_{2im2jm2km}{}^{h}=r_{2im+12jm+12km+1}{}^{h}(h=1,\ldots, H, m=1,\ldots, M, i_m,j_m,$"
to -- $r^{h}{}_{2im2jm2km}=r^{h}{}_{2im+12jm+12km+1}(h=1,\ldots, H, m=1,\ldots, M, i_m,j_m,$ --.

Signed and Sealed this

Twenty-third Day of March, 2004

JON W. DUDAS
*Acting Director of the United States Patent and Trademark Office*